United States Patent [19]

Shalit et al.

[11] 3,925,496
[45] Dec. 9, 1975

[54] PRODUCTION OF STYRENE

[75] Inventors: Harold Shalit, Drexel Hill; Joseph A. Kieras, Lincoln University, both of Pa.

[73] Assignee: Atlantic Richfield Company, Los Angeles, Calif.

[22] Filed: Jan. 21, 1974

[21] Appl. No.: 433,317

[52] U.S. Cl. ............................................ 260/669 R
[51] Int. Cl.² ........................................... C07C 3/30
[58] Field of Search ............................... 260/669 R

[56] References Cited
UNITED STATES PATENTS

| | | | |
|---|---|---|---|
| 2,198,185 | 4/1940 | Muggleton et al. | 260/669 R |
| 3,093,694 | 6/1963 | Soderquist et al. | 260/669 R |
| 3,287,438 | 11/1966 | Frech | 260/680 C |
| 3,388,183 | 6/1968 | Frech | 260/680 C |

FOREIGN PATENTS OR APPLICATIONS 1,089,239  11/1967  United Kingdom............ 260/669 R

*Primary Examiner*—Paul M. Coughlan, Jr.
*Attorney, Agent, or Firm*—John C. Martin, Jr.

[57] ABSTRACT

An improved method for the production of styrene by the thermal conversion of alkyl benzenes which comprises carrying out the conversion in the presence of toluene thereby obtaining improved yields of styrene.

1 Claim, No Drawings

PRODUCTION OF STYRENE

BACKGROUND OF THE INVENTION

In U.S. Pat. No. 2,416,990 (1947) there is shown a process wherein benzene is alkylated with propylene in an alkylation zone to obtain isopropyl benzene (cumene). The isopropyl benzene is admixed with alpha-methyl styrene and the mixture is pyrolyzed to produce styrene. The effluent from this pyrolysis contains benzene, propylene, styrene, alpha-methyl styrene and unreacted isopropyl benzene. The benzene and propylene are returned to the alkylation zone, the alpha-methyl styrene and unreacted isopropyl benzene are admixed with additional isopropyl benzene from the alkylation zone and the mixture returned to the pyrolysis zone. The proportions of isopropyl benzene and alpha-methyl styrene are controlled such that in the pyrolysis zone the formation of alpha-methyl styrene is substantially completely surpressed.

Severson et al in the Canadian Journal of Chemistry, Vol. 49 pages 4023 to 4026 (1971) describe the pyrolysis of cumene, para-cyamene and alpha-methyl styrene at 800°C. It was found that cumene gave an 18.7 per cent yield of styrene together with 27 per cent benzene and numerous other by-products, as well as unreacted cumene. The authors point out that very little was known about the pyrolytic behavior of the terpene-isopropyl group at high temperatures.

Catalytic conversions of various alkyl benzenes have been described in numerous patents, for example, U.S. Pat. No. 3,409,689 (1968) shows that the catalytic dehydrogenation of ethyl benzene gives styrene. In carrying out this process a mixture of steam, toluene and ethyl benzene was added to the reactor utilizing a catalyst consisting of FeO, $Cr_2O_3$, and either NaOH or $K_2CO_3$. Another U.S. Pat. No. 3,379,786 (1968) shows the catalytic dehydrogenation of alkyl aromatic hydrocarbons by contacting the hydrocarbon with a catalyst composition containing alkylized alumina, a Group VIII metal component and a Group Va or VIa metal component under dehydrogenation conditions. Ethyl benzene was converted to styrene, and cumene, ethyl toluene and ethyl naphthalene were also dehydrogenated. In U.S. Pat. No. 3,335,197 (1967) a catalytic dehydrogenation process is disclosed for converting ethyl and isopropyl substituted aromatics with alumina and an oxide of an alkaline earth metal together with an oxide of a low melting metal having an atomic weight of from 65 to 113. The conversion of ethyl benzene to styrene and the conversion of cumene to alpha-methyl styrene is shown.

Thus, in general the conversion of the lower alkyl benzenes to styrene either by pryolysis or by catalytic means has been shown. However, in accordance with this invention the surprising discovery has been made that by adding toluene to the alkyl benzenes being converted a surprising increase in styrene yield is obtained.

SUMMARY OF THE INVENTION

In accordance with this invention alkyl benzene hydrocarbons having from 3 to 9 carbon atoms in the alkyl group and preferably from 3 to 4 carbon atoms in the alkyl group are thermally converted to styrene at temperatures in the range of from 600° to 850°C. at pressures ranging from 0.25 to 10 atmospheres in the presence of 10 to 91 volume per cent of toluene based on the total volume of gaseous hydrocarbon charge.

The presence of toluene greatly increases the yield of styrene as compared with the yields obtained in the absence of toluene. The mechanism of this improvement is not known, but most of the toluene is recovered and can be recycled to the process. A particularly important embodiment of the invention is the thermal conversion of secondary butyl benzene to styrene and ethylene. When this conversion is carried out in the presence of toluene the yield of styrene obtained is increased over that obtained without toluene in the feed.

It is an object of this invention therefore to provide a method for the production of styrene.

It is another object of this invention to provide a method for the production of styrene by the high temperature thermal conversion of alkyl benzenes in the presence of added toluene to obtain improved yields of styrene.

It is another object of this invention to provide a method for the simultaneous production of styrene and ethylene by the high temperature thermal conversion of secondary butyl benzene.

It is another object of this invention to provide a method for the simultaneous production of styrene and ethylene by the high temperature thermal conversion of secondary butyl benzene in the presence of added toluene.

Other objects of this invention will be apparent from the description of the invention which follows and from the claims.

DESCRIPTION OF THE INVENTION

The alkyl benzenes which can be converted to styrene in accordance with the method of this invention are the monoalkyl benzenes wherein the alkyl group contains from 3 to 9 carbon atoms and preferably from 3 to 4 carbon atoms. Examples of these alkyl benzenes are cumene (isopropyl benzene), n-propyl benzene, secondary butyl benzene, isobutyl benzene, tertiary butyl benzene, n-butyl benzene, the amyl benzenes, the hexyl benzenes, the heptyl benzenes, the octyl benzenes, and the nonyl benzenes. Cumene, of course, is obtainable by the alkylation of benzene with propylene, secondary butyl benzene is obtainable by the alkylation of benzene with butene-1 or butene-2. Higher alkyl benzenes are also obtainable from the alkylation of benzene with the corresponding olefin or monochloroparaffin. In some instances these result during the production of detergent alkylate and are lighter than the desired carbon range for such alkylate, thus they are frequently known as light alkylates. The higher alkylated products also can either be straight chain or branched chain. In general, the alkylated benzenes having more than 4 carbon atoms are less desirable as feed stocks since a large proportion of such compounds are converted to cracked gases which require separation and recovery. Cumene is particularly desirable as is secondary butyl benzene. The latter compound produces two useful products, namely, styrene and ethylene.

The cracking is carried out at temperatures in the range of from 600° to 850°C. and preferably from 700° to 800°C. Pressures can range from 0.25 to 10 atmospheres with 0.5 to 5 atmospheres being preferred and 0.5 to 1 being most preferred, i.e. absolute pressures.

Ordinary tubular reactors are preferred, also preferably packed with ceramic pieces such as alundum. However, other inert materials such as glass beads and the like can be used.

The mole ratio of toluene to hydrocarbon can range from 0.1:1 to 10:1 with from 0.5:1 to 2:1 being preferred. An inert diluent gas, for instance, nitrogen or similar inert gas can be employed, preferably in an amount ranging from 10 to 90 volume per cent based on the total volume of the toluene-hydrocarbon charge and diluent; from 30 to 80 volume per cent is preferred for the diluent gas.

The contact time can range from 0.1 to 2.0 seconds with a more preferred time being from 0.25 to 1.25 seconds and with the most preferred time being 0.4 to 1.2 seconds.

As has been pointed out toluene is required in order to achieve the desired improvement in styrene yield. Benzene is completely ineffective while the xylenes have shown some improvement when cumene is being converted. Nevertheless, for all practical purposes toluene is substantially unique in its function and that it is not a modifying agent for the reaction as shown in British Pat. No. 1,089,239 wherein a large number of compounds including hydrogen sulfide and its derivatives and halogen containing compounds are shown as modifying agents in the reaction for the production of styrene from alkyl benzenes.

The following examples are provided for the purpose of further illustrating the invention. These, however, should not be construed as limiting the invention solely to their disclosures.

The runs were carried out in a quartz tube packed with tubular alumina. The tube was provided with a preheating section, a heated constant temperature reaction zone, condenser and receivers for the gaseous and liquid products. In carrying out the runs a 10 to 15 minute fore-run was employed to stabilize the system and then a 1 hour run at reaction conditions was carried out. Residence time is based on the constant temperature reaction zone. Since laboratory scale equipment was employed, any hold-up in the reaction tube could either cause an apparent high weight balance from material in the fore-run which was added to the actual run material or an apparent low weight balance if some material was held up in the reaction tube at the end of the run. Each run, however, was consistent in itself with respect to the distribution of compounds in the reactor effluent so that all the runs were comparative.

In the examples the charge is given in volume per cent, however, since this is measured in the vapor phase at the same temperature, volume per cent is equivalent to mole per cent. In order to facilitate the comparison of results, reactor effluent distribution is shown in some examples both in moles per mole of the alkyl benzene charged and also on the basis of pounds per 100 pounds of alkyl benzene on a no loss basis. This also facilitates comparison of the runs without and with toluene present. The reaction conditions and results are shown in each Example.

Each of the runs in the following Examples were carried out at atmospheric pressure, since higher or lower pressures are not markedly advantageous.

EXAMPLE I

| Run No. | Sec.-butylbenzene | | 1 | 2 |
|---|---|---|---|---|
| Temp. °C. | | | 750 | 750 |
| Contact time, sec. | | | 1.0 | 1.0 |
| Total hydrocarbon charged, g. | | | 100.0 | 168.65 |
| Feed gas comp. vol. % | | | | |
| Diluent gas, $N_2$ | | | 90.0 | 80.0 |
| Toluene | | | — | 10.0 |
| sec-Butylbenzene | | | 10.0 | 10.0 |
| Wt. balance % | | | 92.7 | 104.4 |
| Effluent Distribution: | $A_1$ | $B_1$ | $A_2$ | $B_2$ |
| Hydrogen | 0.892 | 1.3 | 0.127 | 0.2 |
| Methane | 0.755 | 9.0 | 1.007 | 12.0 |
| Ethylene | 0.724 | 15.1 | 0.925 | 19.3 |
| Ethane | 0.094 | 2.1 | 0.139 | 3.1 |
| Propylene | 0.051 | 1.6 | 0.054 | 1.7 |
| Benzene | 0.203 | 11.8 | 0.366 | 21.3 |
| Toluene | 0.033 | 2.3 | 0.602 | 41.3 |
| Xylenes | 0.002 | 0.2 | 0.005 | 0.4 |
| Ethylbenzene | 0.011 | 0.9 | 0.025 | 2.0 |
| Styrene | 0.317 | 24.6 | 0.409 | 31.7 |
| α-methylsytrene | 0.055 | 4.8 | 0.055 | 4.8 |
| Cumene | 0.001 | 0.1 | 0.001 | 0.1 |
| Unidentified | | 9.0 | | 14.2 |
| Tars | | 12.4 | | 9.5 |
| Coke | 0.537 | 4.8 | 0.507 | 5.1 |

$A_1$ and $A_2$ are in moles per mole of sec-butylbenzene.
$B_1$ and $B_2$ are in pounds per 100 pounds of sec-butylbenzene on a no loss basis.

These results demonstrate that increased amounts of both styrene and ethylene are obtained by the use of equimolar amounts of toluene and sec.-butylbenzene as compared with sec.-butylbenzene alone, styrene increase being almost 30 per cent by weight. It will be seen that 60 per cent of the toluene is recovered.

EXAMPLE II

| Run No. | Cumene | 3 | 4 |
|---|---|---|---|
| Temp., °C. | | 750 | 750 |
| Contact time, sec. | | 1.0 | 1.0 |
| Total hydrocarbon charged, g. | | 100.0 | 176.65 |
| Feed gas comp., vol. % | | | |
| Diluent gas, $N_2$ | | 90.0 | 80.0 |
| Toluene | | — | 10.0 |
| Cumene | | 10.0 | 10.0 |
| Wt. balance % | | 94.0 | 86.1 |

EXAMPLE II-continued

| Run No. | Cumene | | 3 | 4 |
|---|---|---|---|---|
| Effluent Distribution: | $A_3$ | $B_3$ | $A_4$ | $B_4$ |
| Hydrogen | 0.787 | 1.3 | 0.890 | 1.8 |
| Methane | 0.593 | 7.9 | 0.804 | 10.7 |
| Ethylene | 0.348 | 8.1 | 0.275 | 6.4 |
| Ethane | 0.028 | 0.7 | 0.020 | 0.5 |
| Propylene | 0.143 | 5.0 | 0.034 | 1.2 |
| Butylenes | | | 0.090 | 4.2 |
| Benzene | 0.206 | 13.4 | 0.382 | 24.8 |
| Toluene | 0.044 | 3.4 | 0.648 | 49.6 |
| Xylenes | 0.002 | 0.2 | 0.006 | 0.6 |
| Ethylbenzene | 0.007 | 0.8 | 0.027 | 2.4 |
| Styrene | 0.263 | 22.8 | 0.418 | 36.2 |
| α-methylstyrene | 0.067 | 6.6 | 0.086 | 8.4 |
| Cumene | 0.001 | 0.1 | 0.001 | 0.1 |
| Unidentified | | 10.2 | | 23.4 |
| Tars | | 14.1 | | 0.0 |
| Coke | 0.530 | 5.3 | 0.641 | 6.4 |

$A_3$ and $A_4$ are in moles per mole of cumene
$B_3$ and $B_4$ are in pounds per 100 pounds of cumene on a no loss basis.

The increase in styrene production by the use of toluene is greater than in Example I, being about 60 per cent by weight, while the toluene recovery is about 65 per cent by weight.

EXAMPLE III

In this run a high mole ratio, 9:1, of toluene to sec-butylbenzene was employed instead of the 1:1 ratio employed in Example I.

| Run No. | | 5 | |
|---|---|---|---|
| Temperature, °C. | | 726 | |
| Contact time, sec. | | 1.0 | |
| Total hydrocarbon charged, g. | | 718.1 | |
| Feed gas comp., vol. % | | | |
| Diluent gas, $N_2$ | | 10.06 | |
| Toluene | | 80.95 | |
| sec-butylbenzene | | 8.99 | |
| Wt. balance % | | 97.43 | |
| Effluent Distribution: | $A_5$ | | $B_5$ |
| Hydrogen | 1.060 | | 1.6 |
| Methane | 0.864 | | 10.3 |
| Ethylene | 0.518 | | 10.8 |
| Ethane | 0.295 | | 6.6 |
| Propylene | 0.016 | | 0.5 |
| Benzene | 0.551 | | 32.0 |
| Toluene | 8.253 | | 565.8 |
| Xylenes | 0.029 | | 2.3 |
| Ethylbenzene | 0.127 | | 10.0 |
| Styrene | 0.815 | | 63.2 |
| α-Methylstyrene | 0.105 | | 9.3 |
| Cumene | 0.007 | | 0.6 |
| Unidentified | 0.0 | | 0.0 |
| Tars | 0.0 | | 0.0 |
| Coke | 0.559 | | 5.0 |

$A_5$ is in moles per mole of sec-butylbenzene
$B_5$ is in pounds per 100 pounds of sec-butylbenzene on a no loss basis.

These results show that very high yields of styrene are obtained at a mole ratio of toluene to sec-butylbenzene of 9:1.

EXAMPLE IV

| | Comparative-toluene only | | |
|---|---|---|---|
| Run No. | 6 | 7 | 8 |
| Temperature, °C. | 751 | 802 | 801 |
| Contact time, sec. | 1.0 | 1.0 | 2.0 |
| Feed gas comp., vol. % | | | |
| Diluent gas, $N_2$ | 80 | 80 | 80 |
| Toluene | 20 | 20 | 20 |
| Wt. balance % | 89 | 90 | 80 |
| Effluent Distribution: | $B_6$ | $B_7$ | $B_8$ |
| Hydrogen | 0.03 | 0.39 | 1.33 |
| Methane | | 1.20 | 6.40 |
| Ethylene | | | 0.50 |
| Benzene | 0.60 | 4.40 | 20.10 |
| Toluene | 98.60 | 91.00 | 67.50 |
| Ethylbenzene | 0.10 | | 0.10 |
| Xylenes | | | 0.60 |
| Styrene | 0.17 | 0.61 | 0.82 |
| Coke | 0.50 | 2.20 | 2.30 |

$B_6$, $B_7$ and $B_8$ are in pounds per 100 pounds of toluene on a no loss basis.

It is apparent that toluene alone even under the most severe conditions produces less than 1 per cent styrene.

EXAMPLE V

| | Isobutylbenzene | | | |
|---|---|---|---|---|
| Run No. | | 9 | | 10 |
| Temperature, °C. | | 750 | | 750 |
| Contact time, sec. | | 1.0 | | 1.0 |
| Total hydrocarbon charged, g. | | 100 | | 168.65 |
| Feed gas comp., vol. % | | | | |
| Diluent gas, $N_2$ | | 90 | | 80 |
| Toluene | | | | 10 |
| Isobutylbenzene | | 10 | | 10 |
| Wt. balance % | | 83 | | 78 |
| Effluent Distribution: | $A_9$ | $B_9$ | $A_{10}$ | $B_{10}$ |
| Hydrogen | 0.935 | 1.39 | 1.174 | 1.75 |
| Methane | 0.629 | 7.5 | 0.780 | 9.3 |
| Ethylene | 0.489 | 10.2 | 0.503 | 10.5 |
| Ethane | 0.035 | 0.8 | 0.027 | 0.6 |
| Propylene | 0.297 | 9.3 | 0.390 | 12.2 |
| Butylenes | 0.023 | 1.0 | 0.021 | 0.9 |
| Benzene | 0.188 | 10.9 | 0.293 | 17.0 |
| Toluene | 0.245 | 16.8 | 1.003 | 68.8 |
| Xylenes | 0.003 | 0.23 | 0.008 | 0.6 |
| Ethylbenzene | 0.018 | 1.46 | 0.024 | 1.9 |

EXAMPLE V-continued

| Run No. | Isobutylbenzene | | 9 | 10 |
|---|---|---|---|---|
| Styrene | 0.190 | 14.70 | 0.227 | 17.6 |
| α-Methylstyrene | 0.019 | 1.63 | 0.017 | 1.5 |
| Cumene | | | 0.001 | 0.1 |
| Unidentified | | 8.07 | | 14.5 |
| Tars | | 11.66 | | 5.3 |
| Coke | 0.525 | 4.7 | 0.578 | 5.6 |

$A_9$ and $A_{10}$ are in moles per mole of isobutylbenzene
$B_9$ and $B_{10}$ are in pounds per 100 pounds of isobutylbenzene on a no loss basis.

It will be seen that an increase in styrene is obtained by the use of toluene and substantially all of the toluene is recovered.

EXAMPLE VI

| Run No. | Tertiarybutylbenzene | | 11 | 1.2 |
|---|---|---|---|---|
| Temperature °C. | | | 750 | 751 |
| Contact time, sec. | | | 1.0 | 1.0 |
| Total hydrocarbon charge, g. | | | 100.0 | 168.65 |
| Feed gas comp., vol. % | | | | |
| Diluent gas, $N_2$ | | | 90 | 80 |
| Toluene | | | | 10 |
| Tertiarybutylbenzene | | | 10 | 10 |
| Wt. balance % | | | 91 | 86 |
| Effluent Distribution: | $A_{11}$ | $B_{11}$ | $A_{12}$ | $B_{12}$ |
| Hydrogen | 0.859 | 1.3 | 1.174 | 1.8 |
| Methane | 0.872 | 10.4 | 1.157 | 13.8 |
| Ethylene | 0.254 | 5.3 | 0.230 | 4.8 |
| Ethane | 0.058 | 1.3 | 0.049 | 1.1 |
| Propylene | 0.073 | 2.3 | 0.067 | 2.1 |
| Butylenes | 0.052 | 2.2 | 0.050 | 2.1 |
| Benzene | 0.248 | 14.4 | 0.389 | 22.6 |
| Toluene | 0.039 | 2.7 | 0.589 | 40.4 |
| Xylenes | 0.002 | 0.2 | 0.006 | 0.5 |
| Ethylbenzene | 0.008 | 0.6 | 0.028 | 2.2 |
| Styrene | 0.146 | 11.3 | 0.257 | 19.9 |
| α-Methylstyrene | 0.185 | 16.3 | 0.241 | 21.2 |
| Cumene | 0.001 | 0.1 | 0.001 | 0.1 |
| Unidentified | | 15.6 | | 28.4 |
| Tars | | 10.1 | | 1.1 |
| Coke | 0.637 | 5.7 | 0.738 | 6.6 |

$A_{11}$ and $A_{12}$ are in moles per mole of tertiarybutylbenzene
$B_{11}$ and $B_{12}$ are in pounds per 100 pounds of tertiarybutylbenzene on a no loss basis.

The amount of styrene is increased by over 75 per cent using the toluene and likewise there is produced even larger amounts of α-methylstyrene. Approximately 60 per cent of the toluene is recovered.

The foregoing runs were carried out at approximately 750°C. with a contact time of 1.0 second in order to render the runs comparative. Other runs at higher and lower temperatures and for longer contact times showed improvement in styrene yield by the use of toluene in admixture with the alkylbenzene but they also showed that temperatures between 700° and 800°C. with a contact time of about 1 second, or slightly less, was optimum. Consequently the temperature in the middle of the optimum range with 1.0 contact time was selected to show the comparative results.

In all of the runs the effluent analyses were made by mass spectroscopy to determine the gaseous components and gas chromatography to determine the liquid components. The coke was determined by burning the reactor with air and determining the $CO_2$ produced.

The examples presented herein were all carried out on single alkylbenzene charge hydrocarbons in order to simplify the showing of the effect of toluene. Similar improvements are shown for mixtures of alkylbenzenes but in all cases toluene is the only compound that gives the desired improvement in styrene yields in accordance with the objects of this invention. Moreover if toluene is dealkylated, benzene is produced so there is an additional economic advantage. On the other hand not only are xylenes of doubtful effectiveness but when they are dealkylated the resulting toluene or even benzene results in an economic loss.

We claim:

1. In the method for the production of styrene by the thermal conversion, at a temperature in the range of from 600° to 850°C. at pressures ranging from 0.25 atmospheres to 10 atmospheres, absolute, and for a contact time in the range of from about 0.1 to 2.0 seconds, of alkyl benzenes selected from the group consisting of cumene and sec-butylbenzene the improvement comprising carrying out said thermal conversion of said alkylbenzene in the presence of added toluene, wherein the mole ratio of added toluene to said alkylbenzene hydrocarbon charge is in the range of from 0.1:1 to 10:1, thereby increasing the yield of styrene.

* * * * *